Patented Mar. 24, 1942

2,277,194

UNITED STATES PATENT OFFICE 2,277,194

COLOR LAKES AND METHOD OF PRODUCING SAME

Gellert Alleman, Wallingford, and John Harold Perrine, Prospect Park, Pa., assignors to Sun Oil Company, Philadelphia, Pa., a corporation of New Jersey No Drawing. Application July 21, 1938, Serial No. 220,518

8 Claims. (Cl. 260—1)

This invention relates to a new type of color lakes and to methods for their production. More particularly, the color lakes in accordance with this invention are derived from certain acids obtained from petroleum.

It was discovered by Harry F. Angstadt (in his Patent No. 1,931,880, dated October 24, 1933) that there was present in the asphaltic still bottoms resulting from the process of distilling lubricating oils described in, for example, the Pew Patent No. 1,761,153, dated June 3, 1930, a group or series of acids formed from the petroleum, which acids could be separated, in the form of their sodium salts or soaps, by the procedure described in the Angstadt patent referred to.

In Alleman Patent No. 1,931,855, dated October 24, 1933, there is described and claimed a method of purifying these acids and securing them in substantially pure form.

The exact nature and properties of this group or series of acids were not known at the time these patents referred to above were applied for, and they were consequently erroneously considered to be substantially identical with certain fatty acids which had previously been obtained from the precipitate produced in the alkali treatment of an acid-treated mineral oil lubricating stock, which series of acids is described and claimed in Alleman Patent No. 1,694,461, dated December 11, 1928.

After extensive investigation it has been found, however, that the acids obtained from the asphaltic still bottoms, while in some respects similar, are by no means identical with the older group of acids obtained from the "alkali precipitate" or "soda sludge." These older acids, as pointed out in Alleman Patent No. 1,694,461, comprise substantially fatty acids belonging to the series $C_nH_{2n-4}O_2$ and $C_nH_{2n-6}O_2$. The newer acids derived from the asphaltic still bottoms, on the contrary, comprise principally acids belonging to the series $C_nH_{2n-8}O_2$ and $C_nH_{2n-10}O_2$. They have refractive indices varying between 1.49815 and 1.51326 as compared to the older acids the refractive indices of which range from 1.48563 and 1.49654 all at 20° C. and referred to the D line of sodium.

It will accordingly be appreciated that these two groups or series of acids, while broadly similar in that they both are acids derived from petroleum, are specifically differentiated by belonging to entirely different series.

It has now been found in accordance with the present invention that valuable color lakes can be formed by precipitating the water-insoluble salts of these new acids in the presence of a suitable water-soluble dye. These new color lakes are valuable in the production of, for example, printing inks, paints, colored varnishes, etc.

The color lakes in accordance with this invention may conveniently be formed by treating an aqueous solution of, for example, the sodium salt (any other water-soluble salt will do) of the petroleum acids, to which a water-soluble dye has been added, with a water-soluble salt of a metal which will form with the acids a water-insoluble product.

The new acids derived from asphaltic still bottoms are first obtained, as described in the Terrell et al. Patent No. 2,056,913 and in the patents referred to above, in a crude state admixed with varying amounts of heavy petroleum oils. However, despite the presence of this oil, the crude acids may be used directly for the production of color lakes in accordance with this invention, unless a dry, granular lake which may be ground to a fine powder is desired.

Thus, a mixture of acids and oil—as obtained directly from the still (for example, according to the process of the Terrell et al. Patent No. 2,056,913)—may be used for the preparation of color lakes in accordance with this invention in the following manner:

Assuming that the mixture of acids and oil has an acid number of 130, to one kilogram of this acid-oil mixture is added about 93 grams of sodium hydroxide (previously dissolved in about 500 cc. of water). The mixture is stirred and allowed to stand for several hours. The sodium soap is thus formed. This sodium soap is dissolved, or suspended, in about 4 liters of water, and about 15 grams of a water-soluble dyestuff added to it. If a red color lake is desired, a water-soluble dyestuff such as Lithsol Rubine B Powder (previously dissolved in water) is added to the soap.

An insoluble metal derivative must now be formed, which metal derivative will adsorb the dyestuff and form a permanent color lake. If it is desired to make the calcium derivative of the above mentioned soap, 129 grams of calcium chloride (previously dissolved in water) is added. If it is desired to make the barium derivative of the above mentioned soap, 283 grams of barium chloride (previously dissolved in water) is added. If it is desired to make the zinc derivative of the above mentioned soap, 158 grams of zinc chloride (previously dissolved in water) is added. If it is desired to make the aluminum derivative of the above mentioned soap, 389 grams of aluminum sulphate (previously dissolved in water) is added. All of these metal derivatives adsorb the dyestuff and form a permanent color lake which is insoluble in water. It will be noted that other metal derivatives can be formed. The amount of a water-soluble metal salt which must be added in order to form the insoluble metal soap can readily be calculated by those familiar with such processes.

If a blue color lake is desired, it may be prepared by adding about 15 grams of a water-soluble blue dyestuff such as Pontacyl Blue R to a kilogram of the above mentioned sodium soap. Other color lakes may be formed by substituting other water-soluble dyestuffs for the dyestuffs above mentioned. The intensity of the color lake may be increased by adding more than the amount of dyestuff above specified, or the intensity may be decreased by adding less than the amount of dyestuff above indicated. It will be understood that the color lakes made from the acids containing hydrocarbon oil will be tacky, non-drying, and pasty or semi-liquid at ordinary temperatures. These color lakes may be employed, when mixed with proper vehicles, for the production of printing inks, paints, colored varnishes, etc.

If, however, it is desired to produce a color lake which is dry, granular and capable of being ground to a fine powder, it will be necessary to remove the petroleum oil from the acids. This may be done by the methods disclosed in the Alleman Patent 1,931,855, referred to above, or it may be done by heating the sodium soap of the crude, oil-containing acids with water, under superatmospheric pressure at all times to prevent boiling. The process, which causes the oil and acid soaps to separate into layers, is analogous in details to that described in the Alleman Patent 1,694,463, dated December 11, 1928.

The thus purified acids, which will have, it is assumed, an acid number of about 180, may then be treated as follows: To one kilogram of the oil-free acids, about 129 grams of caustic soda (previously dissolved in about 500 cc. of water) is added. The mixture is vigorously stirred and allowed to stand for several hours. The sodium soap thus formed is dissolved, or suspended, in about 4 liters of water. To this solution, or suspension, about 20 grams of Lithosol Rubine B Powder (previously dissolved in water) is added. The calcium soap is then formed by adding the required amount of a water-soluble calcium salt to this mixture, and the red color is adsorbed by the calcium derivative. If the barium, zinc or aluminum derivatives are preferred, such derivatives may readily be prepared by adding the proper amount of the corresponding water-soluble barium, zinc or aluminum salts. If a blue color lake is required, about 20 grams of a water-soluble dyestuff such as Pontacyl Blue R may be used in place of the Rubine B.

These oil-free color lakes can be ground very fine after drying, and may be utilized in the manufacture of colored printing inks, colored varnishes, and for any other purpose for which color lakes are employed.

It will be appreciated that the examples and other descriptive matter hereinbefore set out are merely illustrative of the invention and in no way limit the scope thereof, which is defined by the claims hereinafter set forth.

What we claim and desire to protect by Letters Patent is:

1. A color lake comprising the water-insoluble metal salts, precipitated in the presence of a water-soluble dyestuff, of a mixture of acids derived from asphaltic still bottoms obtained in the distillation of petroleum said acids including ones having the generic formula $C_nH_{2n-10}O_2$.

2. A color lake comprising the aluminum salts, precipitated in the presence of a water-soluble dyestuff, of a mixture of acids derived from asphaltic still bottoms obtained in the distillation of petroleum said acids including ones having the generic formula $C_nH_{2n-10}O_2$.

3. A color lake comprising the calcium salts, precipitated in the presence of a water-soluble dyestuff, of a mixture of acids derived from asphaltic still bottoms obtained in the distillation of petroleum said acids including ones having the generic formula $C_nH_{2n-10}O_2$.

4. A color lake comprising the zinc salts, precipitated in the presence of a water-soluble dyestuff, of a mixture of acids derived from asphaltic still bottoms obtained in the distillation of petroleum said acids including ones having the generic formula $C_nH_{2n-10}O_2$.

5. A color lake comprising the substantially oil-free water-insoluble metal salts, precipitated in the presence of a water-soluble dyestuff, of a mixture of acids derived from asphaltic still bottoms obtained in the distillation of petroleum said acids including ones having the generic formula $C_nH_{2n-10}O_2$.

6. A color lake comprising the reaction products of petroleum-oil-containing soluble soaps of a mixture of acids derived from asphaltic still bottoms obtained in the distillation of petroleum said acids including ones having the generic formula $C_nH_{2n-10}O_2$, a water-soluble soap-precipitating metal salt and a water-soluble dyestuff.

7. The method of forming a color lake which comprises forming the water-soluble salts of a mixture of acids derived from asphaltic still bottoms obtained in the distillation of petroleum said acids including ones having the generic formula $C_nH_{2n-10}O_2$, adding to an aqueous solution of said salts a water-soluble dyestuff, and then adding to said solution a water-soluble salt of a metal which will form with said acids water-insoluble salts.

8. A color lake comprising a water-insoluble metal salt, precipitated in the presence of a water-soluble dyestuff, of an acid derived from asphaltic still bottoms obtained in the distillation of petroleum and having the generic formula $C_nH_{2n-10}O_2$.

GELLERT ALLEMAN.
JOHN HAROLD PERRINE.